(12) United States Patent
Burrell et al.

(10) Patent No.: US 12,418,458 B1
(45) Date of Patent: Sep. 16, 2025

(54) APPLICATION FRAMEWORK FOR MANAGING INFORMATION TECHNOLOGY INFRASTRUCTURE

(71) Applicant: AMERICAN MEGATRENDS INTERNATIONAL, LLC, Duluth, GA (US)

(72) Inventors: Brandon Burrell, Suwanee, GA (US); Muthukkumaran Ramalingam, Duluth, GA (US); Stefano Righi, Lawrenceville, GA (US); Paul Rhea, Lawrenceville, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 0 days.

(21) Appl. No.: 18/303,951

(22) Filed: Apr. 20, 2023

(51) Int. Cl.
*H04L 41/22* (2022.01)
(52) U.S. Cl.
CPC .................. *H04L 41/22* (2013.01)
(58) Field of Classification Search
CPC ...................................................... H04L 41/22
See application file for complete search history.

(56) References Cited

U.S. PATENT DOCUMENTS

| | | | |
|---|---|---|---|
| 8,776,073 B1 * | 7/2014 | Morlen | G06F 16/245 |
| | | | 718/103 |
| 11,080,031 B2 | 8/2021 | Bequet et al. | |
| 11,086,607 B2 | 8/2021 | Bequet et al. | |
| 11,086,608 B2 | 8/2021 | Bequet et al. | |
| 11,086,671 B2 | 8/2021 | Bequet et al. | |
| 11,137,990 B2 | 10/2021 | Bequet et al. | |
| 11,144,293 B2 | 10/2021 | Bequet et al. | |
| 2015/0319590 A1 * | 11/2015 | Sharon | H04L 67/535 |
| | | | 455/456.3 |
| 2016/0048408 A1 * | 2/2016 | Madhu | H04L 47/783 |
| | | | 718/1 |
| 2017/0193425 A1 * | 7/2017 | Roman | H04L 51/224 |
| 2021/0224051 A1 * | 7/2021 | Bequet | G06F 9/45533 |
| 2023/0014775 A1 * | 1/2023 | Dotan-Cohen | H04L 51/046 |
| 2023/0162137 A1 * | 5/2023 | Capozzi | G06Q 10/08355 |
| | | | 705/338 |

* cited by examiner

*Primary Examiner* — Farzana B Huq
(74) *Attorney, Agent, or Firm* — Newport IP, LLC; Ryan Donoghue

(57) ABSTRACT

An application framework for managing information technology ("IT") infrastructure includes components that enable jobs to be defined and executed that perform IT infrastructure management tasks. Jobs are defined utilizing a user interface ("UI") that includes a first pane that provides functionality for receiving a selection of a target type of IT infrastructure for a job. Compatible action blocks are then displayed in a second pane of the UI. User input can be received associating action blocks with a third pane of the UI. When user input is received associating an action block with the third pane of the UI, a task identifier is displayed in the third pane of the UI. The UI can also receive a selection of target devices upon which the actions defined by a job are to be performed. The framework executes program code corresponding to action blocks in the job on the target devices.

15 Claims, 11 Drawing Sheets

INFRASTRUCTURE MANAGEMENT FRAMEWORK
ARCHITECTURE AND WORKFLOW

APPLICATION FRAMEWORK FOR MANAGING INFORMATION TECHNOLOGY INFRASTRUCTURE

BACKGROUND

Modern data centers and enterprises commonly include significant amounts of information technology ("IT") infrastructure. For example, large data centers can have hundreds of thousands or even millions of server computers. Managing this volume of IT infrastructure can be very complex, particularly where components of the IT infrastructure are highly varied. For instance, in order to perform a desired management task (e.g., updating firmware or changing a firmware setting) on a group of server computers in a data center, an administrator might need to perform a single action or a sequence of actions, utilize multiple software tools (e.g., executing an application or a script remotely), and utilize multiple communication channels (e.g., in-band and/or out-of-band).

Given the complexity of managing IT infrastructure, it can be very difficult for system administrators to perform desired management tasks. As a result, IT infrastructure might not be managed in a manner that allows it to operate in the most secure and efficient way, thereby resulting in IT infrastructure that is less secure and that utilizes computing resources less efficiently than otherwise possible.

It is with respect to these and other technical considerations that the disclosure made herein is presented.

SUMMARY

Technologies are described herein that provide an application framework for managing IT infrastructure. Through implementations of the disclosed technologies, IT infrastructure management tasks can be performed more simply and easily than previously possible. This enables system administrators to manage IT infrastructure such that it operates more securely and efficiently than when utilizing previous management technologies. Technical benefits other than those specifically mentioned herein can also be realized through an implementation of the disclosed technologies.

In order to provide the functionality described herein, an application framework for managing IT infrastructure is disclosed that includes components that enable jobs to be defined that include one or more actions for performing IT management functions. Once defined, the jobs can be executed on one or more target devices in order to perform the specified IT management tasks. For example, jobs can be defined that include various types of actions including, but not limited to, performing a RESTful application programming interface ("API") action, a shell script, or a command execution on one or more target devices.

In an embodiment, jobs are defined utilizing a user interface ("UI") for managing IT infrastructure that includes a first pane, a second pane, and a third pane. In an embodiment, the first pane provides functionality for receiving a selection of a target type of IT infrastructure for a job. For example, and without limitation, the first pane may specify target types including security hosts, REDFISH services, REDFISH systems, and internet protocol ("IP") addresses. REDFISH is a network standard and API for the management of IT infrastructure including servers, networks, storage devices, facilities equipment, and other converged infrastructure ("CI") components in software-defined hybrid IT environments like web-scale data centers and cloud infrastructure.

Once the target type for a job has been defined utilizing the UI, action blocks are displayed in the second pane. Action blocks are UI elements that have corresponding program code for performing an action on an instance of IT infrastructure of the selected target type. The action blocks displayed in the second pane of the UI are selected based upon the selected target type. For instance, if a REDFISH system is selected as the target type, action blocks can be displayed in the second pane of the UI that include, but are not limited to, action blocks for performing a shell script, a generic REST action, an in-band firmware update, changing firmware settings in-band, for causing a target device to sleep for a period of time, resetting a target device, and for executing an ANSIBLE playbook. Other types of action blocks corresponding to program code for performing other types of IT management tasks can be presented in the second pane of the UI for other target types.

Once the action blocks have been displayed in the second pane of the UI, user input can be received that associates an action block with the third pane of the UI. For example, and without limitation, a user can select an action block with a user input device (e.g., a mouse or trackpad) and drag the selected action block to the third pane of the UI. Other mechanisms can be utilized for associating an action block displayed in the second pane of the UI with the third pane of the UI in other embodiments.

When user input is received that associates an action block with the third pane of the UI, a task identifier is displayed in the third pane of the UI. The task identifier identifies the action block and indicates the location of the action block within an ordered list of task identifiers that make up a job. In embodiments, the task identifier also includes a UI element which, when selected, causes a UI to be presented for configuring the action block identified by the task identifier. The task identifier might also include a UI element which, when selected, causes the task identifier to be removed from the third pane. This process can then be repeated for other action blocks in order to define an ordered list of task identifiers in the third pane of the UI.

Once a user has defined a job in the manner described above, the UI can receive a selection of target devices within an IT infrastructure upon which the actions defined by the job are to be performed. In an embodiment, the UI can also provide functionality for defining a schedule according to which the job is to be performed. Thereafter, the program code corresponding to the action blocks in the job is executed on the selected target devices in the order defined by the ordered list of task identifiers according to the defined schedule, if any.

In order to execute the program code for action blocks in a job, the program code is executed on the selected targets within the IT infrastructure using an application framework for managing IT infrastructure. The application framework includes various components including, but not limited to, a data store that stores data defining jobs, an action service that retrieves jobs from the data store and places messages on a message queue, and worker computing devices that retrieve the messages from the message queue and, in response thereto, cause the program code corresponding to the action blocks in the job to be executed on the selected target device s within the IT infrastructure in the order defined by the ordered list.

The application framework for managing IT infrastructure also includes an API server for accessing the functionality provided by the application framework. In an embodiment, for instance, data is retrieved from the API server for use in displaying the UI. Additional details regarding the configuration and operation of the application framework for managing IT infrastructure and the associated UI for defining jobs for performing IT infrastructure management tasks will be provided below.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing an application framework for managing IT infrastructure. As discussed briefly above, implementations of the disclosed technologies enable IT infrastructure management tasks to be performed more simply and easily than previously possible. This enables system administrators to manage IT infrastructure such that the infrastructure operates more securely and efficiently than when utilizing previous management technologies. Technical benefits other than those specifically mentioned herein can also be realized through an implementation of the disclosed technologies. Additional details regarding these aspects will be provided below with regard to FIGS. 1-4.

It is to be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 1:
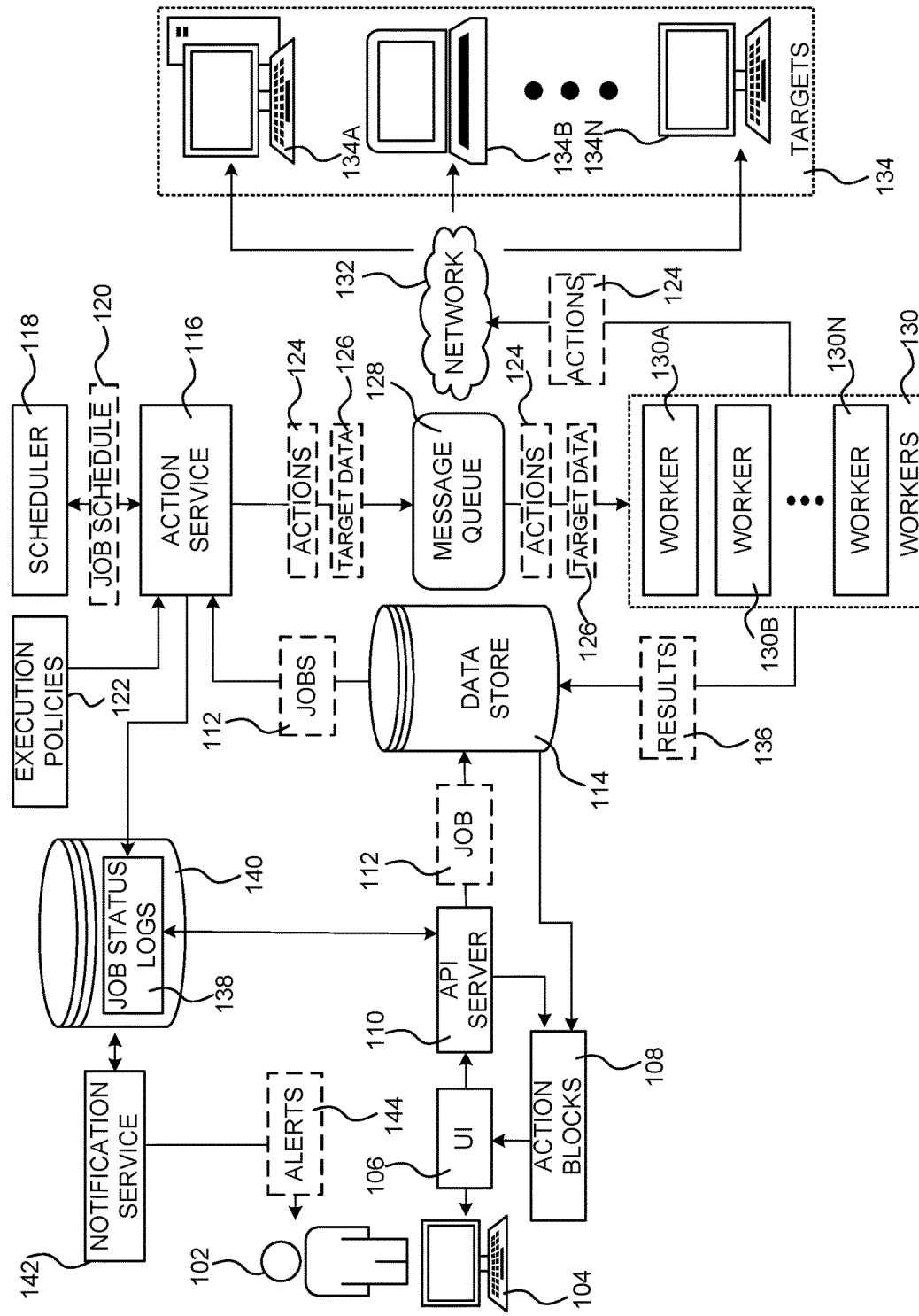
FIG. 1 is a software architecture diagram illustrating aspects of a mechanism disclosed herein for providing an application framework for managing IT infrastructure, according to one embodiment.

FIG. 1 is a software architecture diagram showing aspects of an illustrative application framework for managing IT infrastructure disclosed herein, according to one embodiment. As described briefly above, and in greater detail below, the framework shown in FIG. 1 includes components that enable jobs to be defined that include one or more actions for performing IT management functions. For instance, in an embodiment a user 102, such as a system administrator, can utilize a computing device 104, such as a desktop or laptop computer, to access functionality provided by a UI 106. As will be described in greater detail below, the UI 106 provides functionality for defining a job 112 to be performed on devices (e.g., server computers, networking devices, etc.) in an IT infrastructure using action blocks 108. The action blocks 108 are UI elements that have corresponding program code, referred to herein as "actions" 124, for performing a management function on an instance of IT infrastructure.

Once a job 112 has been defined using the UI 106, the job 112 can be executed on one or more target devices 134 (e.g., the target devices 134A-134N) in order to perform the specified IT management task, or tasks, on the target devices 134. For example, a job 112 can be defined using the UI 106 that performs various types of actions 124 on one or more of the target devices 134 (which might be referred to herein as "targets") including, but not limited to, performing a RESTful API action, a shell script, or a command execution on one or more target devices.

In an embodiment, the application framework for managing IT infrastructure shown in FIG. 1 also includes an API server 110 for accessing the functionality provided by the application framework. In an embodiment, for instance, data stored in the data store 114 is retrieved from the API server 110 for use in displaying the UI 106. In a similar fashion, the UI 106 can also utilize functionality provided by the API server 110 to store data defining a job 112 in an appropriate data store 114. The API server 110 can also expose methods for utilizing other aspects of the functionality provided by the illustrated application framework in other embodiments.

In order to execute jobs 112, the illustrated application framework includes an action service 116, in one embodiment. The action service 116 is a network service configured to retrieve jobs 112 from the data store and to enqueue messages on a message queue 128 for executing the jobs 112. For example, and without limitation, the action service 116 might enqueue messages on the message queue identifying the particular actions 124 that are to be performed and target data 126 (which might be referred to herein as "data 126") identifying the targets 134 upon which the actions 124 are to be performed.

In an embodiment, jobs 112 can specify a schedule 120 upon which they are to be executed. In this embodiment, a scheduler 118 retrieves the schedule 120 from the action service 116. Subsequently, the scheduler 118 instructs the action service 116 to initiate performance of a job 112 according to the specified schedule 120. As will be described in greater detail below, the UI 106 provides functionality for specifying the schedule 120 for a job 112 in one embodiment. As shown in FIG. 1, a user 102 can also specify execution policies 122 that are consumed by the action service 116 to influence the manner in which the action service 116 causes jobs 112 to execute, in an embodiment.

As also illustrated in FIG. 1, worker computing devices 130A-130N (which might be referred to herein as "workers 130") dequeue the messages from the message queue 128 that identify the particular actions 124 that are to be performed and the target data 126 that identifies the targets 134 upon which the actions 124 are to be performed. The workers 130 then cause the specified actions 124 to be executed on the targets 134 specified by the data 126. As shown in FIG. 1, the workers 130 can communicate with the targets 134 through a network 132, or networks. In this regard, it is to be appreciated that the framework illustrated in FIG. 1 has been simplified for ease of discussion and that more networks, network devices, targets 134, workers 130, network services, and other components can be utilized to provide the functionality disclosed herein.

The workers 130 also receive data describing the results 136 of the execution of the actions 124 on the targets 134. The workers 130, in turn, store the data describing the results 136 in the data store 114. The action service 116 retrieves the data describing the results 136 from the data store 114. In response thereto, the action service 116 can also update job status logs 138 in the data store 140. The job status logs 138 include data describing the status of the execution of the jobs 112 such as, for example, the results 136 provided by the workers 130.

As shown in FIG. 1, the disclosed framework also includes a notification service 142 in one embodiment. The notification service 142 is a network service that retrieves data describing the execution of jobs 112 from the job status logs 138 and provides alerts 144 to users 102. For example, and without limitation, the notification service 142 might provide alerts 144 indicating the success or failure of jobs 112 executed on the targets 134. Other types of alerts 144 can be provided in other embodiments.

FIGS. 2A-2F are a user interface diagrams showing aspects of an illustrative UI 106 for utilizing functionality provided by the application framework for managing IT infrastructure shown in FIG. 1, according to one embodiment. In particular, and as described briefly above, the UI 106 provides functionality for defining the actions 124 to be performed by a particular job 112 using action blocks 108. As discussed above, action blocks 108 are UI elements that have corresponding program code (i.e., the actions 124) for performing a management function on an instance of IT infrastructure of the selected target type (e.g., the targets 134).

Figure 2A:
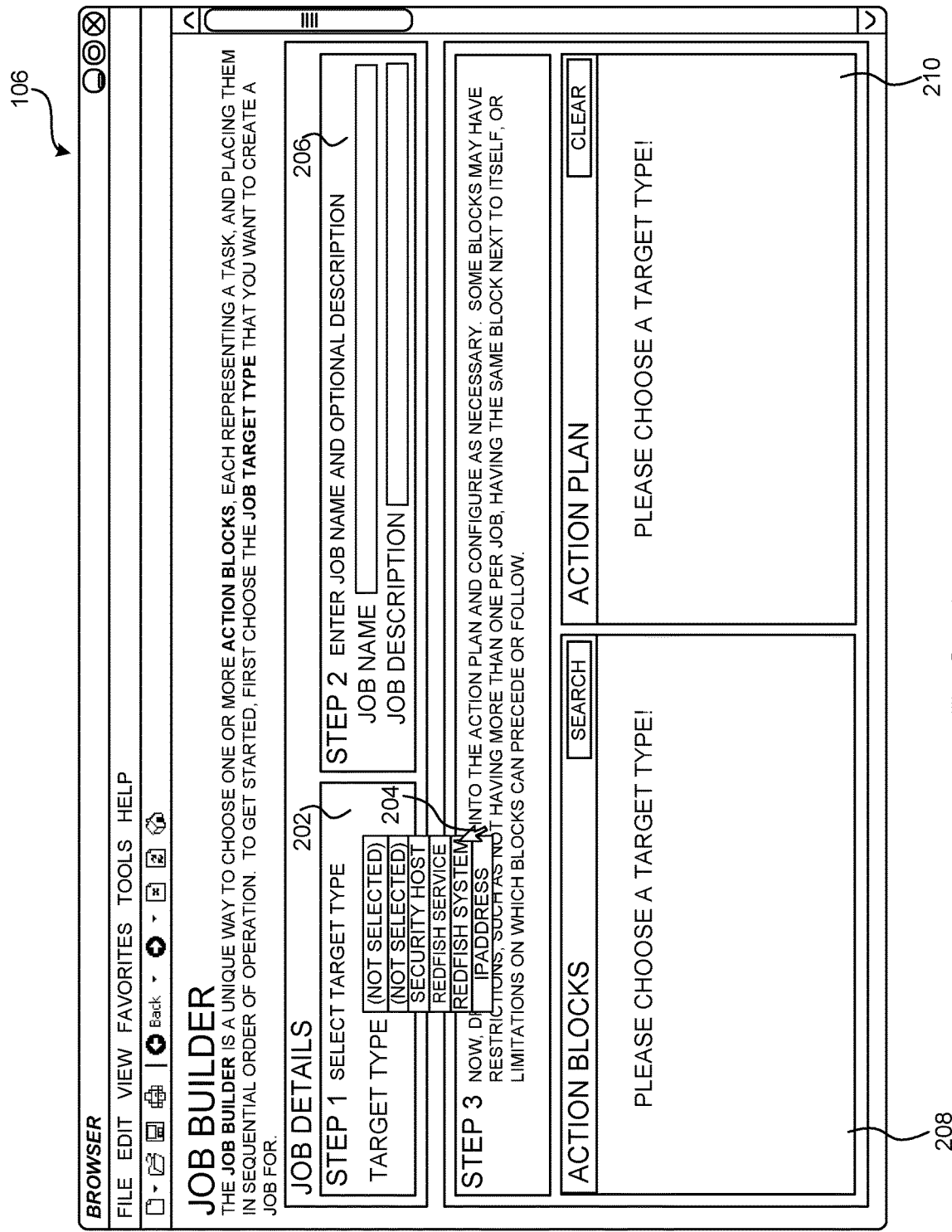
FIG. 2A is a user interface diagram showing aspects of an illustrative user interface for utilizing functionality provided by the application framework for managing IT infrastructure shown in FIG. 1, according to one embodiment.

As shown in FIG. 2A, the UI 106 provides functionality for defining jobs 112 through a first pane 202, a second pane 208, and a third pane 210, in an embodiment. In the illustrated embodiment, the first pane 202 provides functionality for receiving a selection of a target type of IT infrastructure for a new job 112. In the illustrated embodiment, for instance, a user 102 has utilized a mouse cursor 204 to select a drop-down menu that illustrates the potential target types available. In this example, the first pane 202 specifies target types including security hosts, REDFISH services, REDFISH systems, and internet protocol ("IP") addresses. REDFISH is a network standard and API for the management of IT infrastructure including servers, networks, storage devices, facilities equipment, and other CI components in software-defined hybrid IT environments like web-scale data centers and cloud infrastructure. Other target types of IT infrastructure can be presented and selected through the first pane 202 in other embodiments.

In an embodiment, a fourth pane 206 is presented that provides functionality for providing a name and a description for a new job 112 created using the UI 106. Other types of metadata associated with a new job 112 can be specified through the UI 106 in other embodiments.

Figure 2B:
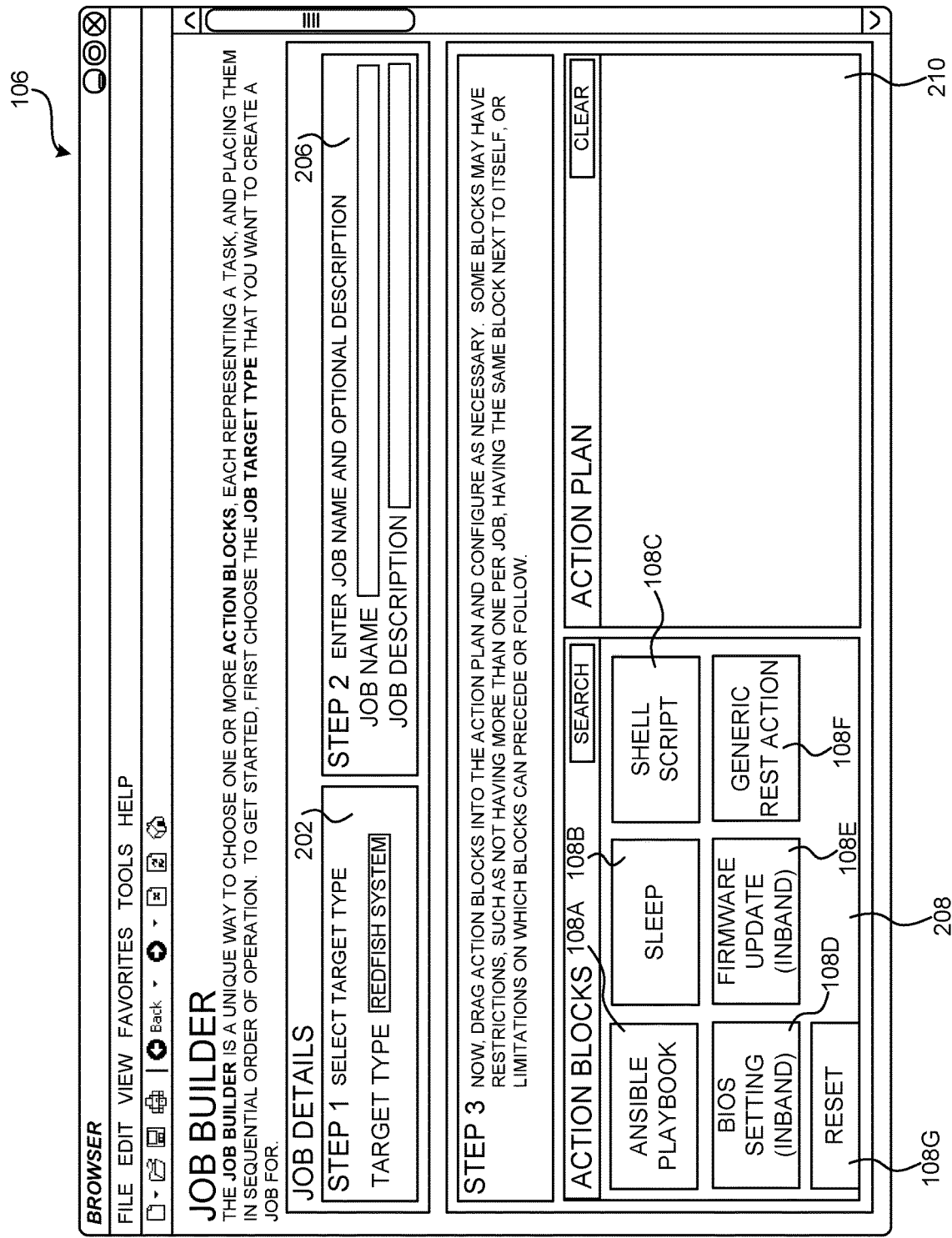
FIG. 2B is a user interface diagram showing additional aspects of the illustrative user interface shown in FIG. 2A for utilizing functionality provided by the application framework for managing IT infrastructure shown in FIG. 1, according to one embodiment.

As shown in FIG. 2B, once the target type for a new job 112 has been defined utilizing the first pane 202 of the UI 106, action blocks 108 are displayed in the second pane 208. In the illustrated example, for instance, the action blocks 108A-108G have been presented in the second pane 208 of the UI 106. A UI control is also presented in the second pane 208 for performing a search of the available action blocks 108 for a selected target type, in an embodiment.

The action blocks 108 displayed in the second pane 208 of the UI 106 are selected based upon the target type selected in the first pane 202. In the illustrated example, for instance, a REDFISH system has been selected as the target type in the first pane 202. Consequently, action blocks 108A-108G have been displayed in the second pane 208 of the UI 106 that are capable of being performed on a REDFISH-compatible computing system. These action blocks 108 include, but are not limited to, action blocks 108 for performing a shell script, a generic REST action, an in-band firmware update, changing firmware settings in-band, for causing a target device to sleep for a period of time, resetting a target device, and for executing an ANSIBLE playbook. Other types of action blocks 108 corresponding to program code for performing other types of IT management tasks can be presented in the second pane 208 of the UI 106 for other target types.

Figure 2C:
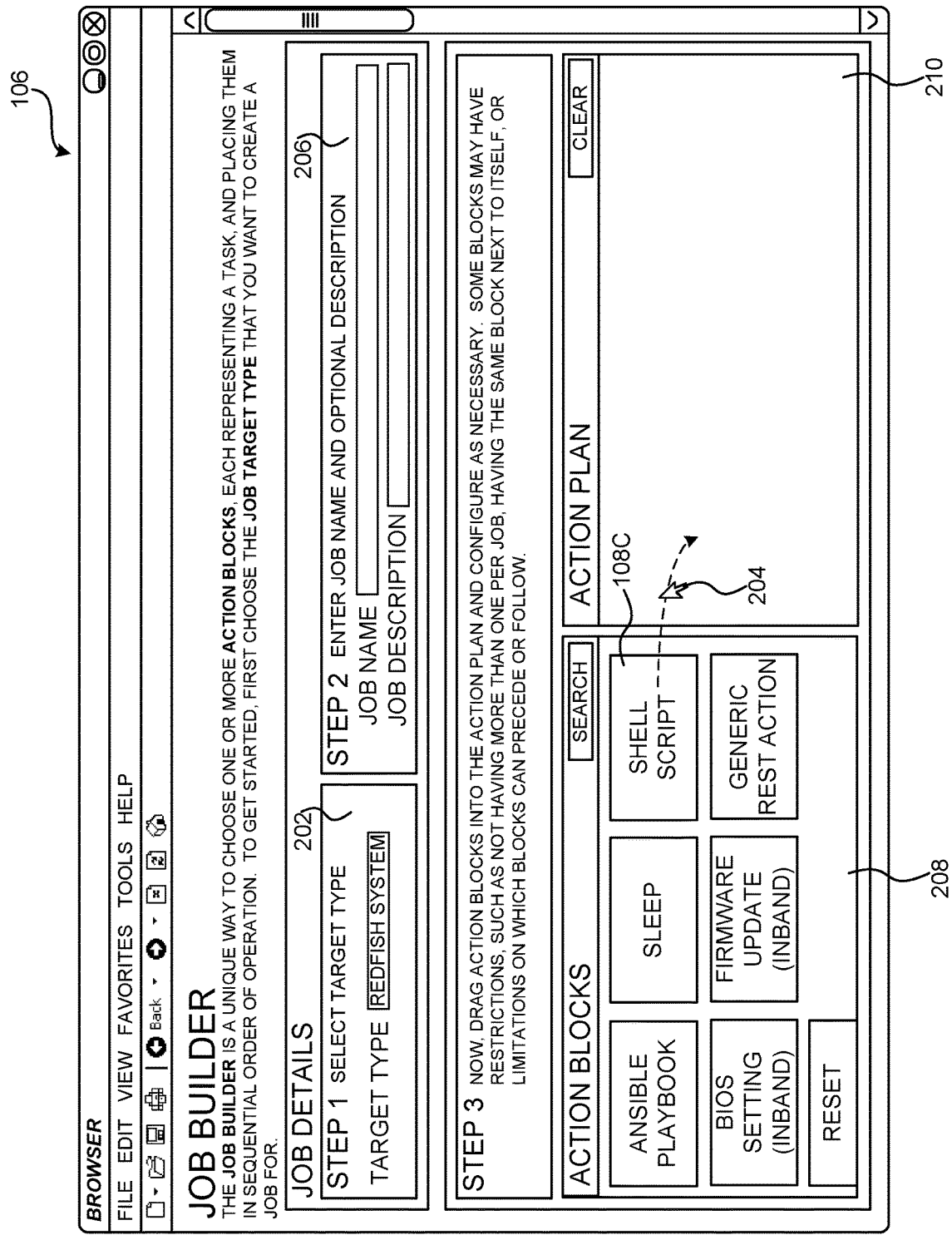
FIG. 2C is a user interface diagram showing additional aspects of the illustrative user interface shown in FIGS. 2A-2B for utilizing functionality provided by the application framework for managing IT infrastructure shown in FIG. 1, according to one embodiment.

As shown in FIG. 2C, once compatible action blocks 108 have been displayed in the second pane 208 of the UI 106, user input can be received that associates an action block 108 with the third pane 210 of the UI 106. In the illustrated example, for instance limitation, a user 102 has selected an action block 108C with the mouse cursor 204 using a suitable user input device (e.g., a mouse or trackpad) and dragged the selected action block 108C to the third pane 210 of the UI. Other mechanisms can be utilized for associating an action block 108 displayed in the second pane 208 of the UI 106 with the third pane 210 of the UI 106 in other embodiments.

Figure 2D:
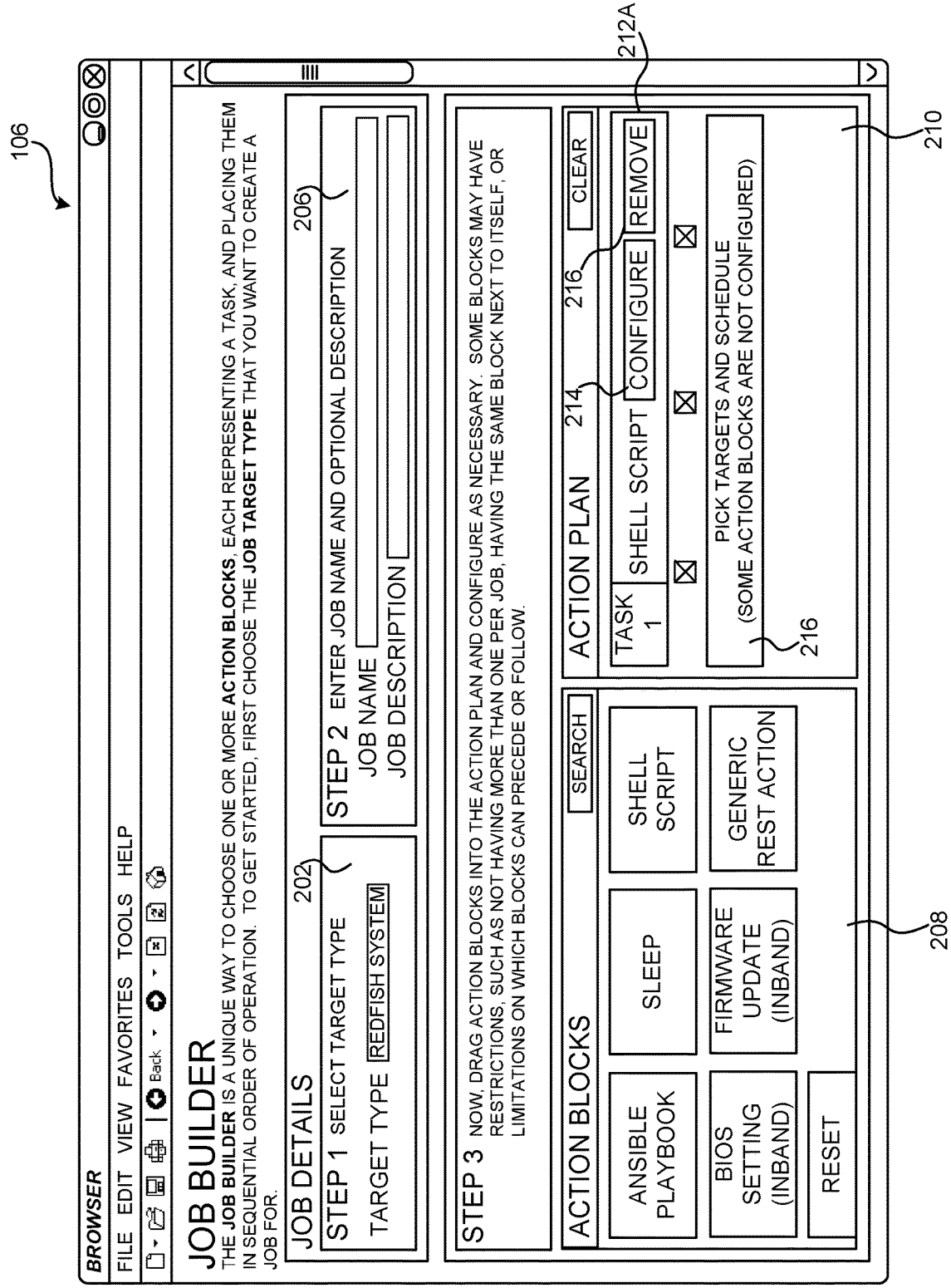
FIG. 2D is a user interface diagram showing additional aspects of the illustrative user interface shown in FIGS. 2A-2C for utilizing functionality provided by the application framework for managing IT infrastructure shown in FIG. 1, according to one embodiment.

As shown in FIG. 2D, when user input is received that associates an action block 108 with the third pane 210 of the UI 106, a task identifier 212 is displayed in the third pane 210 of the UI 106. In the illustrated example, for instance, a task identifier 212A has been displayed in the third pane 210 corresponding to the selected action block 108C.

Each task identifier 212 shown in the third pane 210 identifies a corresponding action block 108 and indicates the location of the action block 108 within an ordered list of task identifiers 212 that make up a job 112. In the illustrated example, for instance, the task identifier 212A corresponds to an action block 108 for performing a shell script on an instance of IT infrastructure.

Figure 2E:
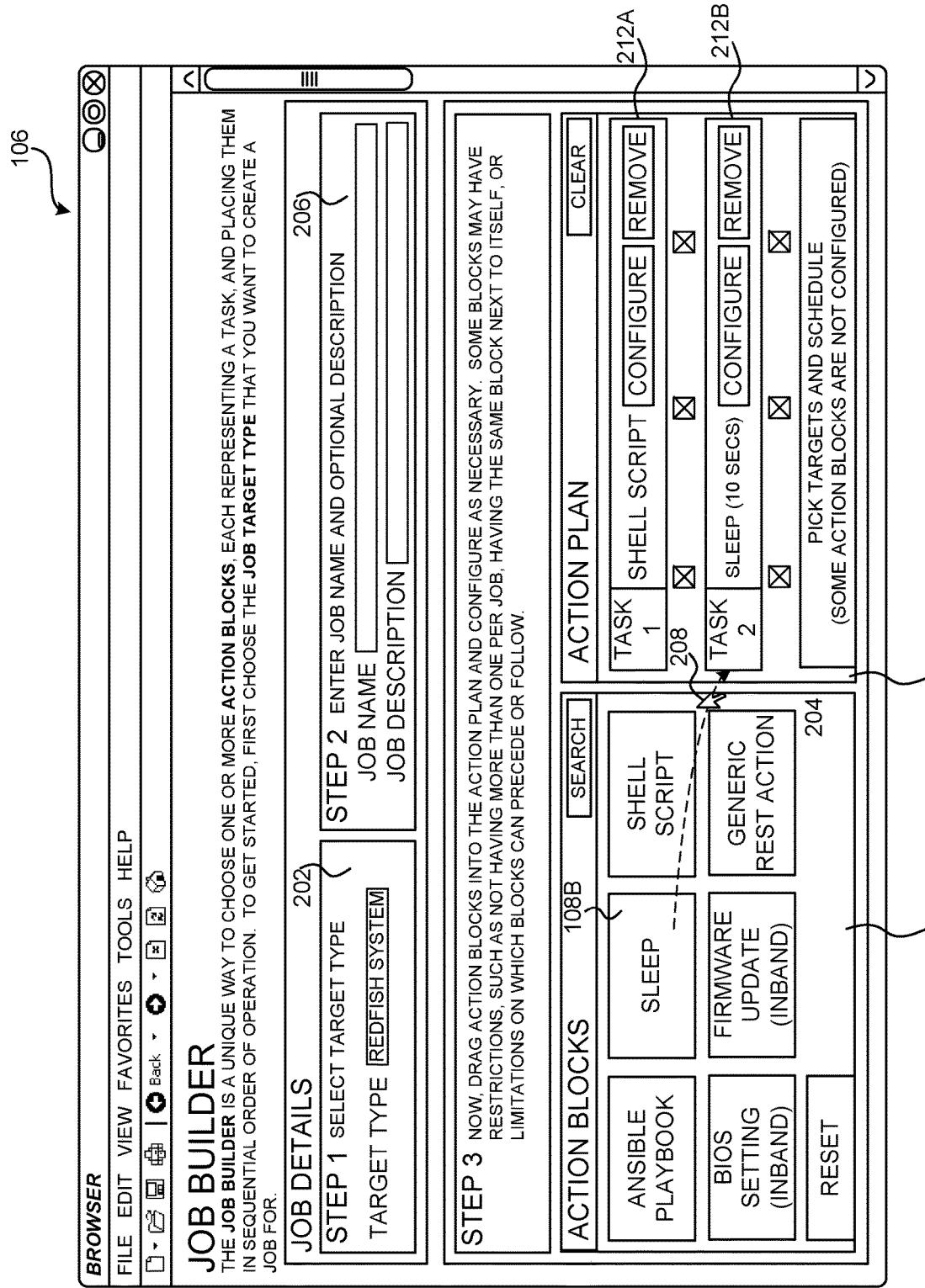
FIG. 2E is a user interface diagram showing additional aspects of the illustrative user interface shown in FIGS. 2A-2D for utilizing functionality provided by the application framework for managing IT infrastructure shown in FIG. 1, according to one embodiment.
Figure 2F:
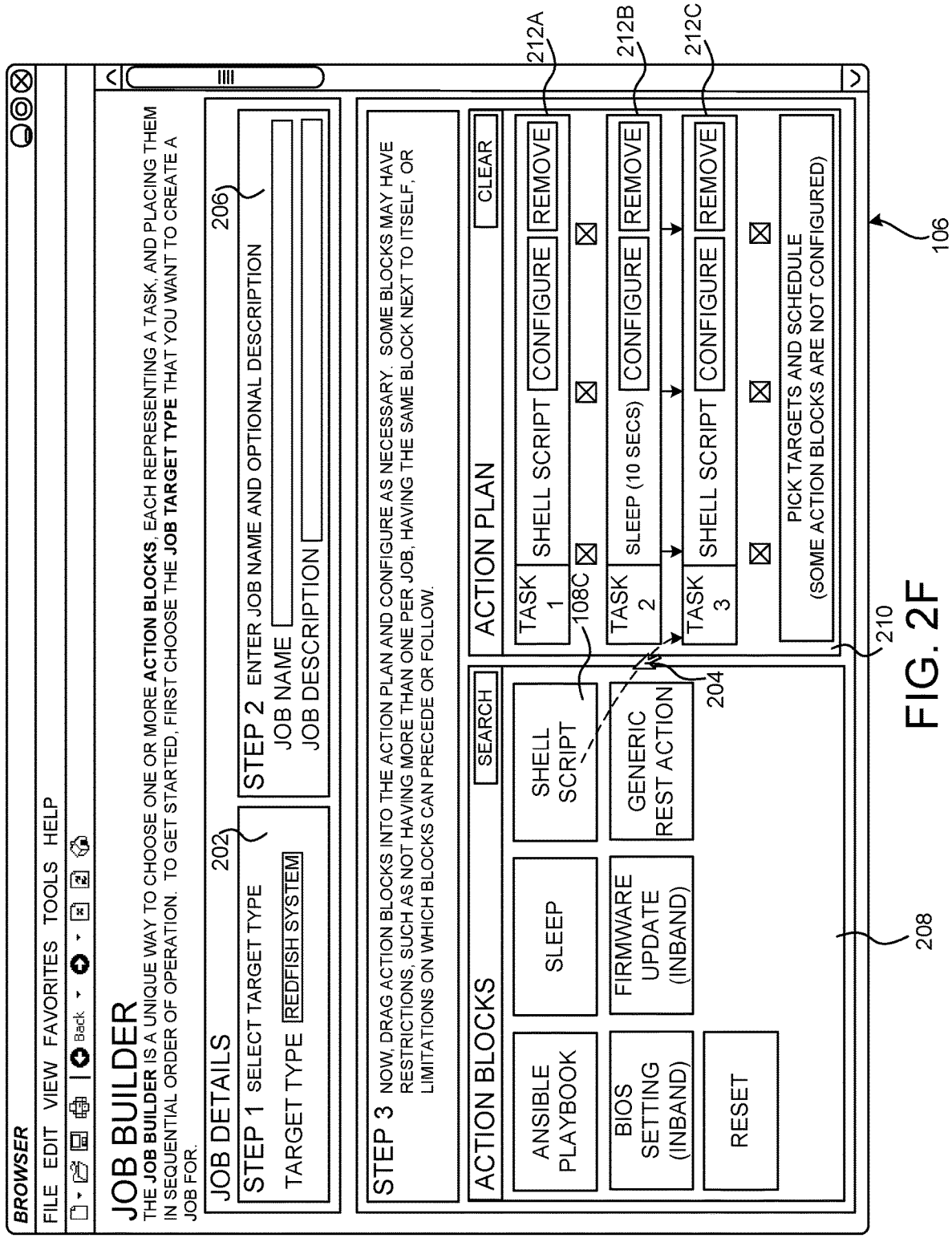
FIG. 2F is a user interface diagram showing additional aspects of the illustrative user interface shown in FIGS. 2A-2E for utilizing functionality provided by the application framework for managing IT infrastructure shown in FIG. 1, according to one embodiment.

As shown in FIGS. 2E and 2F, user input can be received that associates additional action blocks 108 with the third pane 210 of the UI 106. In the example shown in FIG. 2E, for instance, a task identifier 212B has been displayed in the third pane 210 corresponding to the selected action block 108B. In response thereto, a task identifier 212B has been displayed in the third pane 210 of the UI 106 that corresponds to the action block 108B. The task identifier 212B corresponds to an action block 108 for causing an instance of IT infrastructure to sleep for a period of time (e.g., 10 seconds). By placing the task identifier 212B in order following the task identifier 212A, the user has also specified that the action corresponding to the task identifier 212B is to be performed after the action corresponding to the task identifier 212A.

In the example shown in FIG. 2F, another task identifier 212C has been displayed in the third pane 210 corresponding to the selected action block 108C following the drag-and-drop of the action block 108C onto the third pane 106. The task identifier 212C corresponds to an action block 108 for causing an instance of IT infrastructure to sleep for a period of time (e.g., 10 seconds). By placing the task identifier 212C in order following the task identifier 212B, the user has also specified that the action corresponding to the task identifier 212C is to be performed after the action corresponding to the task identifier 212B. Additional action blocks 108 can be associated with the third pane 106 to define a job 112 that performs actions in the order desired by a user 102.

Figure 2G:
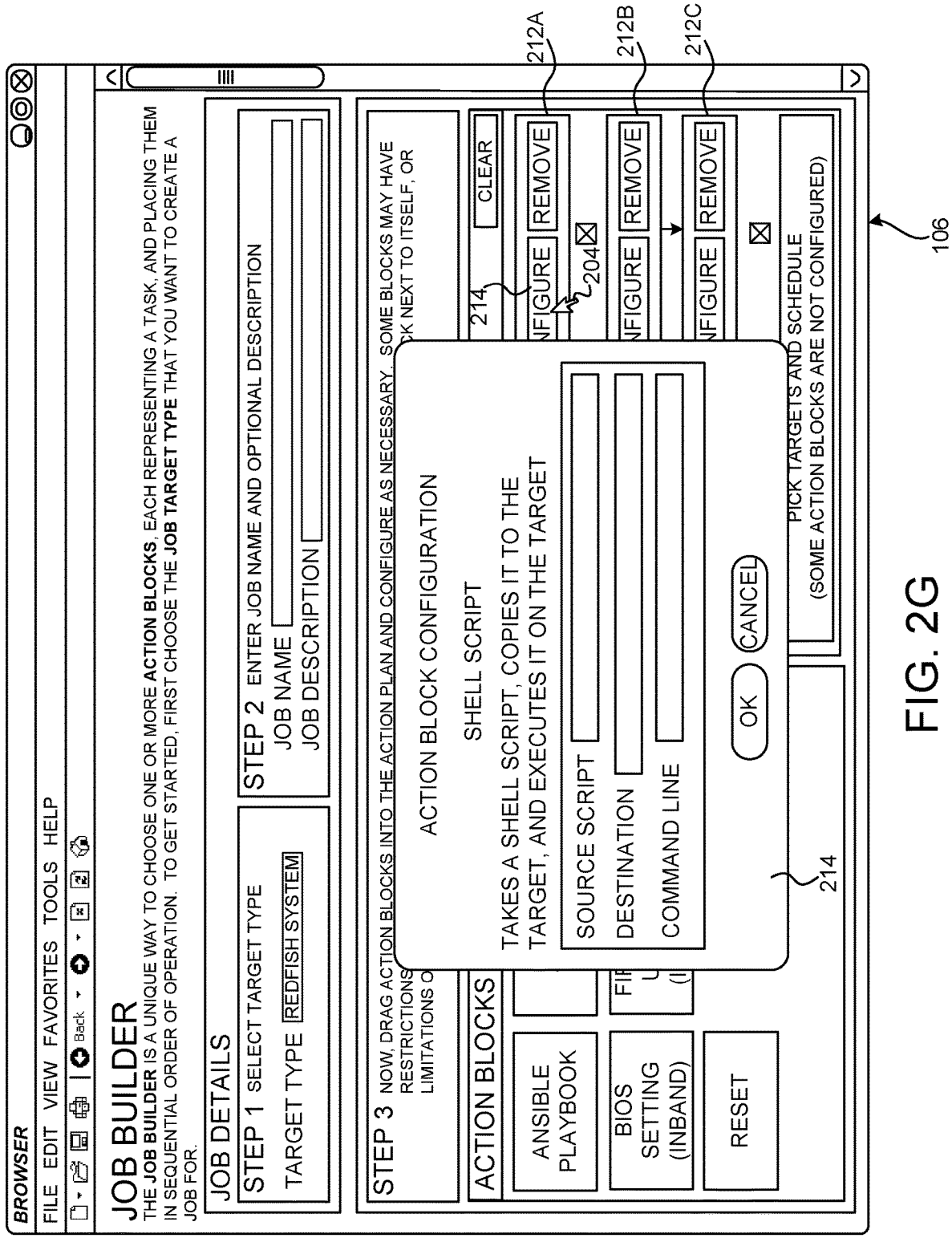
FIG. 2G is a user interface diagram showing additional aspects of the illustrative user interface shown in FIGS. 2A-2F for utilizing functionality provided by the application framework for managing IT infrastructure shown in FIG. 1, according to one embodiment.

As shown in FIG. 2G, each task identifier 212 also includes a UI element 214 which, when selected, causes a UI 214 to be presented for configuring the action block 108 identified by the corresponding task identifier 212. Through the UI 214, a user 102 can configure various aspects of the execution of the action associated with the task identifier 212 such as, for instance, specifying attributes or properties required by an action 124. In the illustrated example, for instance, a user 102 has selected the UI control 214 in order to configure the shell script action associated with the task identifier 212A. In response thereto, the UI 214 has been presented, which allows the user 102 to define the source script, destination, and command line parameters for the shell script action. Other types of configuration parameters can be defined through the UI 214 for other types of actions. Each task identifier 212 might also include a UI element 216 which, when selected, causes a corresponding task identifier 212 to be removed from the third pane 210.

Figure 2H:
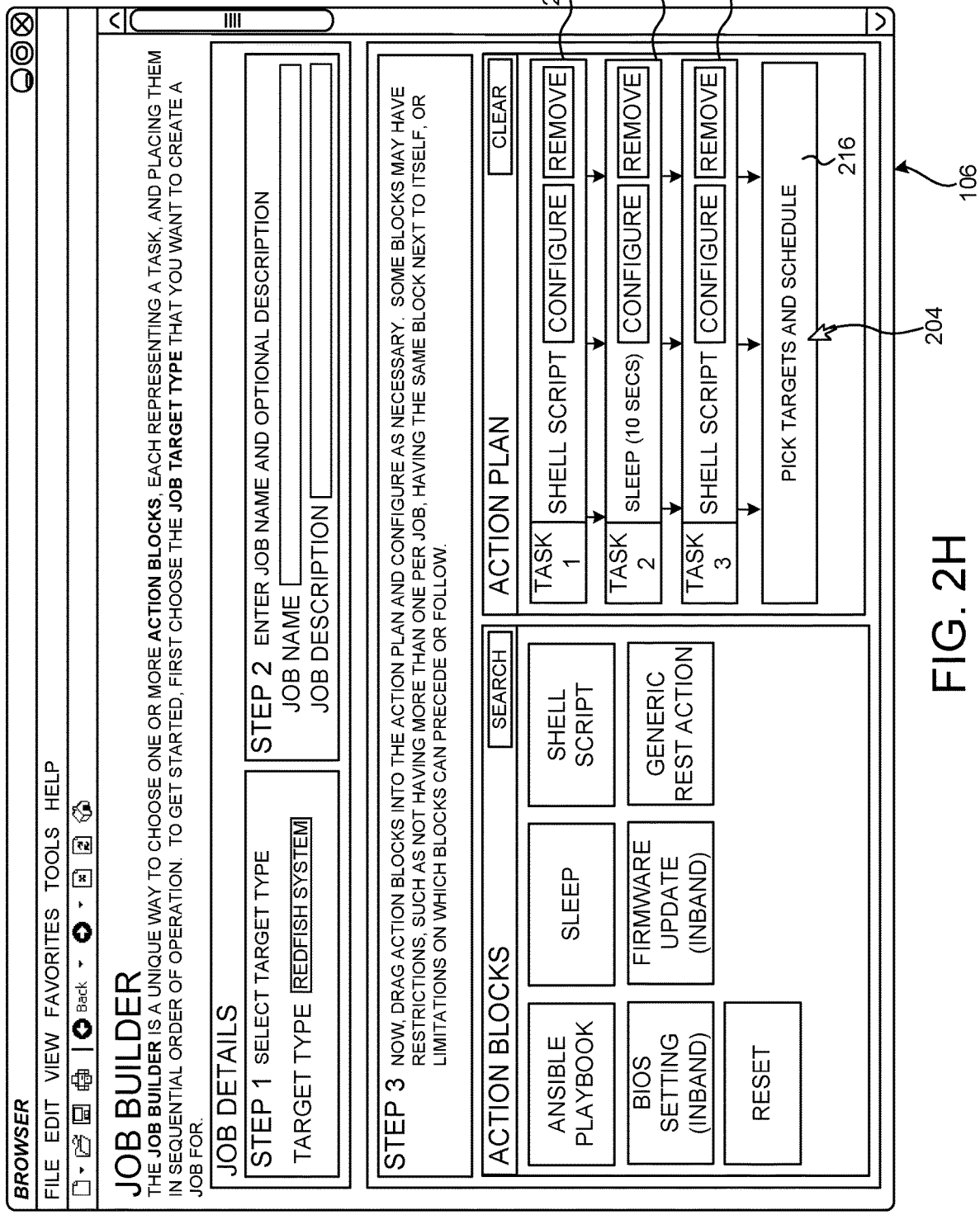
FIG. 2H is a user interface diagram showing additional aspects of the illustrative user interface shown in FIGS. 2A-2G for utilizing functionality provided by the application framework for managing IT infrastructure shown in FIG. 1, according to one embodiment.

As shown in FIG. 2H, once a user 102 has defined the actions for a job 112 and their order of performance in the manner described above, the user 102 can select the UI control 216. In response thereto, a UI (not illustrated) can be presented for receiving a selection of the targets 134 within an IT infrastructure upon which the actions 124 defined by the job 112 are to be performed. In an embodiments, the UI can also provide functionality for defining a schedule according to which the job 112 is to be performed. Thereafter, the program code (i.e., the actions 124) corresponding to the action blocks 108 in the job is 112 executed on the selected targets 134 in the order defined by the ordered list of task identifiers 112 according to the defined schedule, if any, in the manner described above with regard to FIG. 1.

Figure 3:
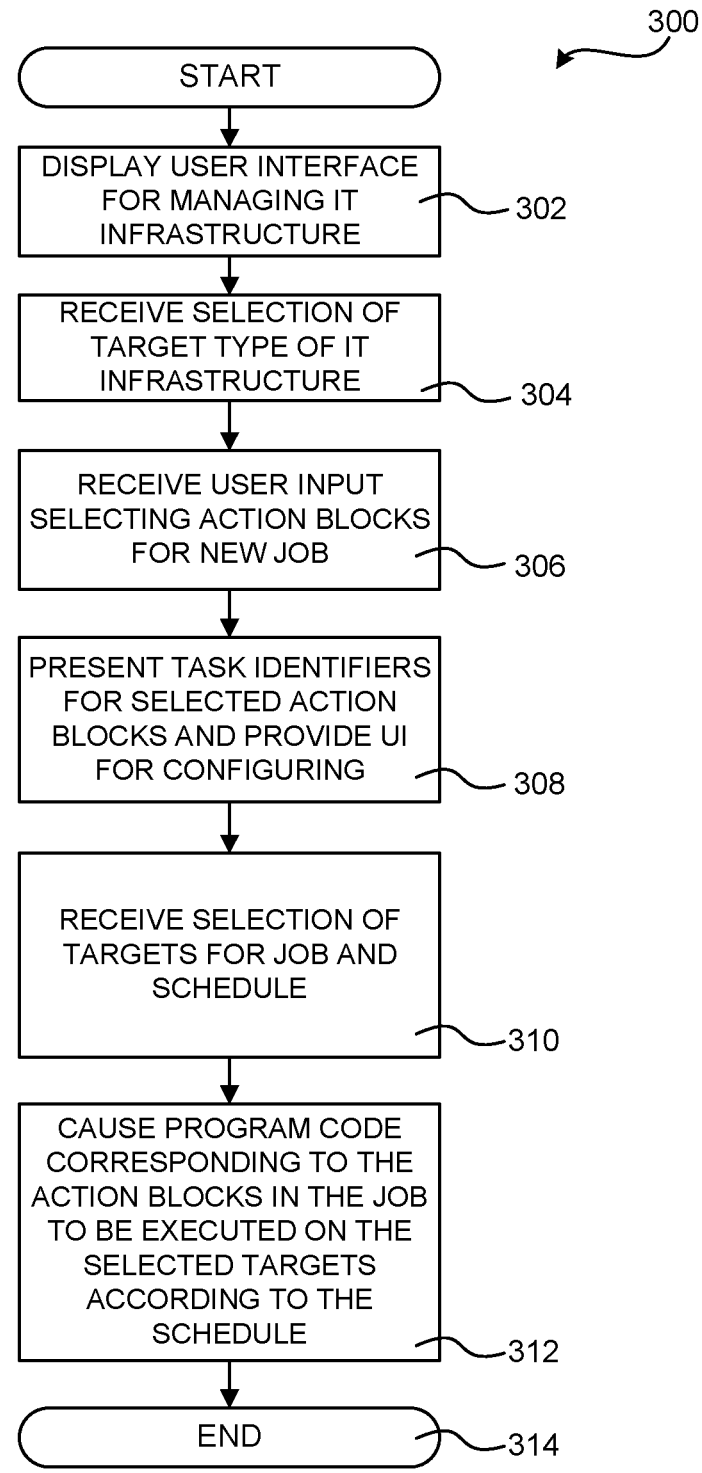
FIG. 3 is a flow diagram showing a routine that illustrates aspects of the operation of the application framework for managing IT infrastructure described with respect to FIGS. 1-2F, according to one embodiment disclosed herein.

FIG. 3 is a flow diagram showing a routine that illustrates additional aspects of mechanism shown in FIGS. 1-2F for providing an application framework for managing IT infrastructure, according to an embodiment disclosed herein. It is to be appreciated that the logical operations described herein with respect to FIG. 3, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. These operations can also be performed by components other than those specifically identified.

The routine 300 begins at operation 302, where the UI 106 for managing IT infrastructure is presented in the manner described above with regard to FIG. 2A. The routine 300 then proceeds from operation 302 to operation 304, where a selection of the target type of IT infrastructure for a new job is received. For instance, in the embodiment of the UI 106 shown in FIGS. 2A-2H, such a selection is received by way of the first pane 202 of the UI 106.

Once a user 102 has selected the target type of IT infrastructure for a new job, the routine 300 proceeds from operation 304 to operation 306. At operation 306, user input is received selecting action blocks 108 for the new job. For example, and as discussed above with reference to FIGS. 2C-2F, a user 102 might drag-and-drop action blocks 108 onto the third pane 210 in a desired order in order to select the action blocks 108 for the new job. In response thereto, task identifiers 212 are presented for the selected action blocks 108. Additionally, a UI 214 can be provided for configuring each of the action blocks 218 represented by task identifiers 212. This occurs at operation 308.

Once a user 102 has completed associating action blocks 108 with the third pane 210, the routine 300 proceeds to operation 310, where the user 102 can specify targets 134 and a schedule for the new job 112 in the manner described above. Thereafter, at operation 312, the framework discussed above with regard to FIG. 1 can execute the program code corresponding to the action blocks 108 in a job 112 on the selected targets 134 according to the specified schedule, if any. The routine 300 then proceeds from operation 312 to operation 314, where it ends.

Figure 4:
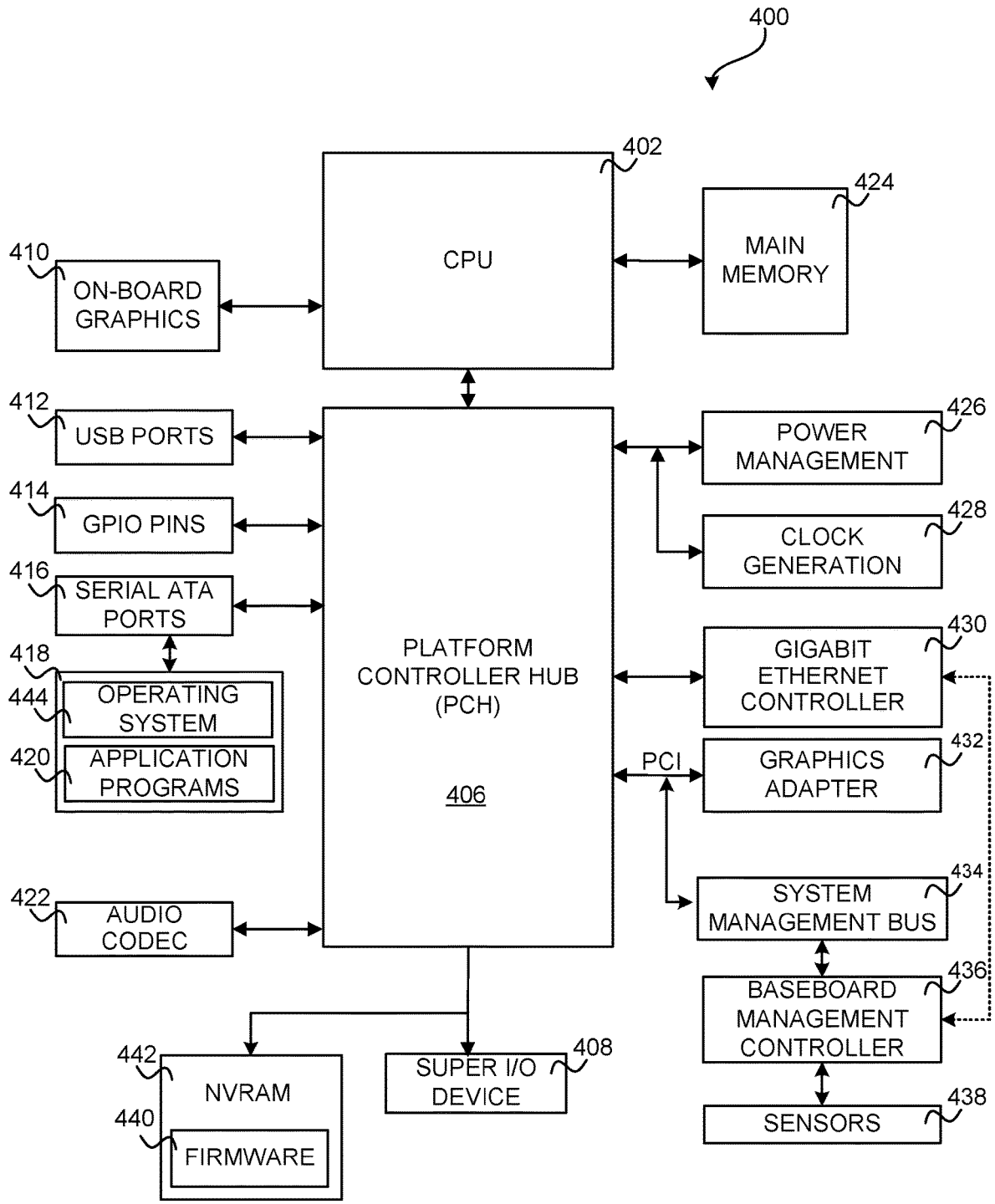
FIG. 4 is a computer architecture diagram that shows an illustrative architecture for a computer that can implement the technologies disclosed herein.

Referring now to FIG. 4, a computer architecture diagram that shows an illustrative architecture for a computer that can provide an operating environment for the technologies presented herein will be described. For example, and without limitation, the computer architecture shown in FIG. 4 can be utilized to implement the workers 130, the targets 134, computing systems that implement components in the application framework for managing IT infrastructure shown in FIG. 1, and/or any of the other computing systems disclosed herein.

FIG. 4 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 4 shows an illustrative computer architecture for a computer 400 that can be utilized in the implementations described herein. The illustrative computer architecture shown in FIG. 4 includes a baseboard, or "motherboard", which is a printed circuit board to which a multitude of components or devices can be connected by way of a system bus or other electrical communication path. In one illustrative configuration, a central processing unit ("CPU") 402 operates in conjunction with a Platform Controller Hub ("PCH") 406. The CPU 402 is a central processor that performs arithmetic and logical operations necessary for the operation of the computer 400. The computer 400 can include a multitude of CPUs 402. Each CPU 402 might include multiple processing cores.

The CPU 402 provides an interface to a random access memory ("RAM") used as the main memory 424 in the computer 400 and, possibly, to an on-board graphics adapter 410. The PCH 406 provides an interface between the CPU 402 and the remainder of the computer 400.

The PCH 406 can also be responsible for controlling many of the input/output functions of the computer 400. In particular, the PCH 406 can provide one or more universal serial bus ("USB") ports 412, an audio codec 422, a gigabit Ethernet controller 430, and one or more general purpose input/output ("GPIO") pins 414. The USB ports 412 can include USB 2.0 ports, USB 3.0 ports and USB 3.1 ports among other USB ports. The audio codec 422 can include Intel High Definition Audio, Audio Codec '97 ("AC'97"), and Dolby TrueHD among others.

The PCH 406 can also include functionality for providing networking functionality through a gigabit Ethernet controller 430 or another type of network controller. The gigabit Ethernet controller 430 is capable of connecting the computer 400 to another computer via a network. Connections which can be made by the gigabit Ethernet controller 430 can include LAN or WAN connections. LAN and WAN networking environments are commonplace in offices, enterprise-wide computer networks, intranets, and the Internet.

The PCH 406 can also provide a bus for interfacing peripheral card devices such as a graphics adapter 432. In one configuration, the bus may be a Peripheral Component Interconnect ("PCI") bus, a Peripheral Component Interconnect extended ("PCI-X") bus, a Peripheral Component Interconnect Express ("PCIe") bus, or another type of suitable bus for interconnecting the various components shown in FIG. 4.

The PCH 406 can also provide a system management bus 434 for use in managing the various components of the computer 400. Additional details regarding the operation of the system management bus 434 and its connected components are provided below. Power management circuitry 426 and clock generation circuitry 428 can also be utilized during the operation of the PCH 406.

The PCH 406 is also configured to provide one or more interfaces for connecting mass storage devices to the computer 400. For instance, according to one configuration, the PCH 406 includes a serial advanced technology attachment ("SATA") adapter for providing one or more serial ATA ports 416. The serial ATA ports 416 can be connected to one or more mass storage devices 418 storing an operating system, such as OS 444 and application programs 420, such as a SATA disk drive. As known to those skilled in the art, an OS 444 comprises a set of programs that control operations of a computer and allocation of resources. An application program 420 is software that runs on top of the OS 444, or other runtime environment, and uses computer resources to perform application specific tasks desired by the user.

According to one configuration, the OS 444 comprises the LINUX operating system or a variant thereof. According to another configuration, the OS 444 comprises a member of the WINDOWS family of operating systems from MICROSOFT CORPORATION. According to another configuration, the OS 444 comprises the UNIX operating system or one of its variants. It should be appreciated that other operating systems can also be utilized.

The mass storage devices connected to the PCH 406, and their associated computer-readable storage media, provide non-volatile storage for the computer 400. Although the description of computer-readable storage media contained herein refers to a mass storage device, such as a hard disk or CD-ROM drive, it should be appreciated by those skilled in the art that computer-readable storage media can be any available media that can be accessed by the computer 400.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 400.

A low pin count ("LPC") interface can also be provided by the PCH 406 for connecting a Super I/O device 408. The Super I/O device 408 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 442 for storing firmware 440 that includes program code containing the basic routines that help to start up the computer 400 and to transfer information between elements within the computer 400.

It should be appreciated that the program modules disclosed herein, including the firmware 440, can include software instructions that, when loaded into the CPU 402 and executed, transform a general-purpose computer 400 into a special-purpose computer 400 customized to facilitate all, or part of, the operations disclosed herein. As detailed throughout this description, the program modules can provide various tools or techniques by which the computer 400 can participate within the overall systems or operating environments using the components, logic flows, and/or data structures discussed herein.

The CPU 402 can be constructed from any number of transistors or other circuit elements, which can individually or collectively assume any number of states. More specifically, the CPU 402 can operate as a state machine or finite-state machine. Such a machine can be transformed to a second machine, or a specific machine, by loading executable instructions contained within the program modules. These computer-executable instructions can transform the CPU 402 by specifying how the CPU 402 transitions between states, thereby transforming the transistors or other circuit elements constituting the CPU 402 from a first machine to a second machine, wherein the second machine can be specifically configured to perform the operations disclosed herein. The states of either machine can also be transformed by receiving input from one or more user input devices, network interfaces (such as the gigabit Ethernet controller 430), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to: the technology used to implement the storage media, whether the storage media are characterized as primary or secondary storage, and the like. For example, if the storage media are implemented as semiconductor-based memory, the program modules can transform the physical state of the semiconductor main memory 424 and/or NVRAM 442. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described above, the PCH 406 can include a system management bus 434. A BMC 436 can be connected to the system management bus 434. The BMC 436 is a microcontroller that monitors operation of the computer 400. In a more specific configuration, the BMC 436 monitors health-related aspects associated with the computer 400, such as, but not limited to, the temperature of one or more components of the computer 400, speed of rotational components (e.g., spindle motor, CPU fan, etc.) within the computer 400, the voltage across or applied to one or more components within the computer 400, and the available and/or used capacity of memory devices within the computer 400. To accomplish these monitoring functions, the BMC 436 is communicatively connected to one or more components by way of the system management bus 434 in some configurations.

In one configuration, these components include sensor devices 438 for measuring various operating and performance-related parameters within the computer 400. The sensor devices 438 can be either hardware or software based components configured or programmed to measure or detect one or more of the various operating and performance-related parameters.

The BMC 106 functions as the master on the system management bus 434 in some implementations, but can also function as a slave in other implementations. Each of the various components communicatively connected to the BMC 436 by way of the system management bus 434 is addressed using a slave address. The system management bus 434 is used by the BMC 436 to request and/or receive various operating, performance-related, and inventory parameters from one or more components, such as the firmware 104, which are also communicatively connected to the system management bus 434.

It should be appreciated that the functionality provided by the computer 400 can be provided by other types of computing devices, including hand-held computers, smartphones, gaming systems, set top boxes, tablet computers, embedded computer systems, personal digital assistants, and other types of computing devices known to those skilled in the art. It is also contemplated that the computer 400 might not include all the components shown in FIG. 4, can include other components that are not explicitly shown in FIG. 4, or might utilize an architecture completely different than that shown in FIG. 4.

Based on the foregoing, it should be appreciated that technologies for providing an application framework for managing IT infrastructure have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computer-implemented method, comprising:
    retrieving data from an application programming interface (API) server for use in displaying a first user interface (UI) for managing information technology (IT) infrastructure, the first UI comprising a first pane, a second pane, and a third pane, wherein the first pane, second pane, and third pane are concurrently displayed to assist in generating an ordered list of task identifiers comprising a job, and wherein an application framework for managing the IT infrastructure comprises the API server;
    receiving, by way of the first pane, a selection of a target type of IT infrastructure;
    responsive to receiving the selection of the target type of IT infrastructure by way of the first pane, displaying a plurality of action blocks in the second pane, each of the plurality of action blocks having corresponding program code for performing an action on an instance of IT infrastructure of the selected target type, wherein the plurality of action blocks are selected based upon the selected target type;
    receiving user input associating an action block with the third pane, wherein the action block is one of the plurality of action blocks;
    responsive to receiving the user input associating the action block with the third pane:
        displaying a task identifier in the third pane, the task identifier identifying the action block and indicating the location of the action block within the ordered list of task identifiers comprising the job; and
        displaying a UI control in the third pane;
    responsive to selecting the UI control in the third pane, retrieving the data from the API server for use in displaying a second UI for selecting targets within the IT infrastructure and defining a schedule for executing the program code corresponding to action blocks identified by the ordered list of task identifiers that the job comprises;
        receiving a first selection in the second UI of targets within the IT infrastructure upon which the action blocks identified by the ordered list of task identifiers are to be performed;
        receiving a second selection in the second UI, wherein the second selection generates the defined schedule for executing the program code corresponding to the action blocks identified by the ordered list of task identifiers that the job comprises;
    storing, in a data store by an application programming interface (API) server, the job, wherein the job further comprises the defined schedule for executing the program code corresponding to the action blocks identified by the ordered list of task identifiers that the job comprises; and
    causing the program code corresponding to the action blocks identified by the ordered list of task identifiers to be executed according to the defined schedule on the selected targets within the IT infrastructure in an order defined by the ordered list of task identifiers in the third pane of the first UI, wherein executing the program code according to the defined schedule comprises:
        retrieving, from the data store by an action service, the job comprising the defined schedule for executing the program code corresponding to the action blocks identified by the ordered list of task identifiers that the job comprises;
        receiving, from the action service by a scheduler, the defined schedule for executing the program code corresponding to the action blocks identified by the ordered list of task identifiers that the job comprises; and
        instructing, by the scheduler, the action service to initiate performance of the job according to the defined schedule for executing the program code corresponding to the action blocks identified by the ordered list of task identifiers that the job comprises.

2. The computer-implemented method of claim 1, wherein the program code comprises one or more of a RESTful API action, a shell script, or a command execution.

3. The computer-implemented method of claim 1, wherein the task identifier further comprises a UI element which, when selected, causes a third UI to be presented for configuring the action block identified by the task identifier.

4. The computer-implemented method of claim 1, wherein the task identifier further comprises a UI element which, when selected, causes the task identifier to be removed from the third pane.

5. The computer-implemented method of claim 1, wherein the program code is executed on the selected targets within the IT infrastructure using an application framework for managing IT infrastructure, the application framework comprising:
    the data store that stores the job;
    the action service that retrieves the job from the data store, wherein the action service places messages on a message queue; and
    a plurality of worker computing devices that retrieve the messages from the message queue and, in response thereto, cause the program code corresponding to the action blocks identified by the ordered list of task identifiers that the job comprises to be executed on the selected targets within the IT infrastructure in the order defined by the ordered list.

6. A non-transitory computer-readable storage medium having computer-executable instructions stored thereupon which, when executed by a computing system, cause the computing system to:
    retrieve data from an application programming interface (API) server for use in display a first user interface (UI) for managing information technology (IT) infrastructure, the first UI comprising a first pane, a second pane, and a third pane, wherein the first pane, second pane, and third pane are concurrently displayed to assist in generating an ordered list of task identifiers that a job comprises, and wherein an application framework for managing the IT infrastructure comprises the API server;

receive, by way of the first pane, a selection of a target type of IT infrastructure;

in response to receiving the selection of the target type of IT infrastructure by way of the first pane, display a plurality of action blocks in the second pane, each of the plurality of action blocks having corresponding program code for performing an action on an instance of IT infrastructure of the selected target type, wherein the plurality of action blocks are selected based upon the selected target type;

receive user input associating an action block with the third pane, wherein the action block is one of the plurality of action blocks;

responsive to receiving the user input associating the action block with the third pane:
    display a task identifier in the third pane, the task identifier identifying the action block and indicating the location of the action block within the ordered list of task identifiers that the job comprises; and
    display a UI control in the third pane;

in response to selecting the UI control in the third pane, retrieve the data from the API server for use in display a second UI for selecting targets within the IT infrastructure and defining a schedule for executing the program code corresponding to action blocks identified by the ordered list of task identifiers that the job comprises;

receive a first selection in the second UI of targets within the IT infrastructure upon which the action blocks identified by the ordered list of task identifiers are to be performed;

receive a second selection in the second UI, wherein the second selection generates the defined schedule for executing the program code corresponding to the action blocks identified by the ordered list of task identifiers that the job comprises;

store, in a data store by an application programming interface (API) server, the job, wherein the job further comprises the defined schedule for executing the program code corresponding to the action blocks identified by the ordered list of task identifiers that the job comprises; and cause the program code corresponding to the action blocks identified by the ordered list of task identifiers to be executed according to the defined schedule on the selected targets within the IT infrastructure in an order defined by the ordered list of task identifiers in the third pane of the first UI, wherein executing the program code according to the defined schedule comprises:
    retrieve, from the data store by an action service, the job comprising the defined schedule for executing the program code corresponding to the action blocks identified by the ordered list of task identifiers that the job comprises;
    receive, from the action service by a scheduler, the defined schedule for executing the program code corresponding to the action blocks identified by the ordered list of task identifiers that the job comprises; and
    instruct, by the scheduler, the action service to initiate performance of the job according to the defined schedule for executing the program code corresponding to the action blocks identified by the ordered list of task identifiers that the job comprises.

7. The non-transitory computer-readable storage medium of claim 6, wherein the program code comprises one or more of a RESTful API action, a shell script, or a command execution.

8. The non-transitory computer-readable storage medium of claim 6, wherein the task identifier further comprises a UI element which, when selected, causes a third UI to be presented for configuring the action block identified by the task identifier.

9. The non-transitory computer-readable storage medium of claim 6, wherein the task identifier further comprises a UI element which, when selected, causes the task identifier to be removed from the third pane.

10. The non-transitory computer-readable storage medium of claim 6, wherein the program code is executed on the selected targets within the IT infrastructure using an application framework for managing IT infrastructure, the application framework comprising:
    the data store that stores the job;
    the action service that retrieves the job from the data store, wherein the action service places messages on a message queue; and
    a plurality of worker computing devices that retrieve the messages from the message queue and, in response thereto, cause the program code corresponding to the action blocks identified by the ordered list of task identifiers that the job comprises to be executed on the selected targets within the IT infrastructure in the order defined by the ordered list.

11. A computing system, comprising:
one or more processors; and
at least one non-transitory computer-readable storage medium having computer-executable instructions stored thereupon which, when executed by the one or more processors, cause the computing system to:
retrieve data from an application programming interface (API) server for use in display a first user interface (UI) for managing information technology (IT) infrastructure, the first UI comprising a first pane, a second pane, and a third pane, wherein the first pane, second pane, and third pane are concurrently displayed to assist in generating an ordered list of task identifiers comprising a job, and wherein an application framework for managing the IT infrastructure comprises the API server;

receive, by way of the first pane, a selection of a target type of IT infrastructure;

in response to receiving the selection of the target type of IT infrastructure by way of the first pane, display a plurality of action blocks in the second pane, each of the plurality of action blocks having corresponding program code for performing an action on an instance of IT infrastructure of the selected target type, wherein the plurality of action blocks are selected based upon the selected target type;

receive user input associating an action block with the third pane, wherein the action block is one of the plurality of action blocks;

responsive to receiving the user input associating the action block with the third pane:
    display a task identifier in the third pane, the task identifier identifying the action block and indicating the location of the action block within the ordered list of task identifiers that the job comprises; and
    display a UI control in the third pane;

in response to selecting the UI control in the third pane, retrieve the data from the API server for use in display a second UI for selecting targets within the IT infrastructure and defining a schedule for executing the program code corresponding to action blocks identified by the ordered list of task identifiers that the job comprises;

receive a first selection in the second UI of targets within the IT infrastructure upon which the action blocks identified by the ordered list of task identifiers are to be performed;

receive a second selection in the second UI, wherein the second selection generates the defined schedule for executing the program code corresponding to the action blocks identified by the ordered list of task identifiers that the job comprises;

store, in a data store by an application programming interface (API) server, the job, wherein the job further comprises the defined schedule for executing the program code corresponding to the action blocks identified by the ordered list of task identifiers that the job comprises; and cause the program code corresponding to the action blocks identified by the ordered list of task identifiers to be executed according to the defined schedule on the selected targets within the IT infrastructure in an order defined by the ordered list of task identifiers in the third pane of the first UI, wherein executing the program code according to the defined schedule comprises:

retrieving, from the data store by an action service, the job comprising the defined schedule for executing the program code corresponding to the action blocks identified by the ordered list of task identifiers that the job comprises;

receiving, from the action service by a scheduler, the defined schedule for executing the program code corresponding to the action blocks identified by the ordered list of task identifiers that the job comprises; and instructing, by the scheduler, the action service to initiate performance of the job according to the defined schedule for executing the program code corresponding to the action blocks identified by the ordered list of task identifiers that the job comprises.

12. The computing system of claim 11, wherein the program code comprises one or more of a RESTful API action, a shell script, or a command execution.

13. The computing system of claim 11, wherein the task identifier further comprises a UI element which, when selected, causes a third UI to be presented for configuring the action block identified by the task identifier.

14. The computing system of claim 11, wherein the task identifier further comprises a UI element which, when selected, causes the task identifier to be removed from the third pane.

15. The computing system of claim 11, wherein the program code is executed on the selected targets within the IT infrastructure using an application framework for managing IT infrastructure, the application framework comprising:

the data store that stores the job;

the action service that retrieves the job from the data store, wherein the action service places messages on a message queue; and a plurality of worker computing devices that retrieve the messages from the message queue and, in response thereto, cause the program code corresponding to the action blocks identified by the ordered list of task identifiers that the job comprises to be executed on the selected targets within the IT infrastructure in the order defined by the ordered list.

\* \* \* \* \*